United States Patent [19]

Dargitz et al.

[11] 3,960,643

[45] June 1, 1976

[54] DRY WALL TAPING DEVICE

[76] Inventors: Arthur Z. Dargitz, 965 McClatchy Way, Sacramento, Calif. 95815; Lawrence A. Dargitz, 21161 S. Wagner Road, Ripon, Calif. 95366

[22] Filed: Jan. 13, 1975

[21] Appl. No.: 540,662

[52] U.S. Cl. .................................. 156/390; 156/526; 156/575; 156/577; 156/579

[51] Int. Cl.² ...................... B32B 31/00; B44C 7/04; B44C 7/08

[58] Field of Search ........... 156/574, 575, 577, 579, 156/390, 523, 524, 526, 280, 305

[56] References Cited

UNITED STATES PATENTS

| | | | |
|---|---|---|---|
| 1,960,850 | 5/1934 | Lloyd | 156/577 |
| 3,188,262 | 6/1965 | Torrison | 156/575 |
| 3,625,798 | 12/1971 | Ihli | 156/574 X |

*Primary Examiner*—William A. Powell
*Assistant Examiner*—M. G. Wityshyn
*Attorney, Agent, or Firm*—Roger B. Webster

[57] ABSTRACT

A device, to apply a tape and covering finish plaster to a dry wall seam in a single pass lengthwise thereover, comprising a relatively light weight, hand-supported frame, a unit on the frame operative—upon predetermined manipulation of the frame—to first apply glue to a length of the tape and then glue-affix the tape to the dry wall over said seam, and another unit on the frame operative—upon such manipulation of the frame, and in conjunction with but trailing the tape gluing and applying unit—to apply a thin, smooth, layer of plaster (known as "mud") over the then-in-place tape.

12 Claims, 7 Drawing Figures

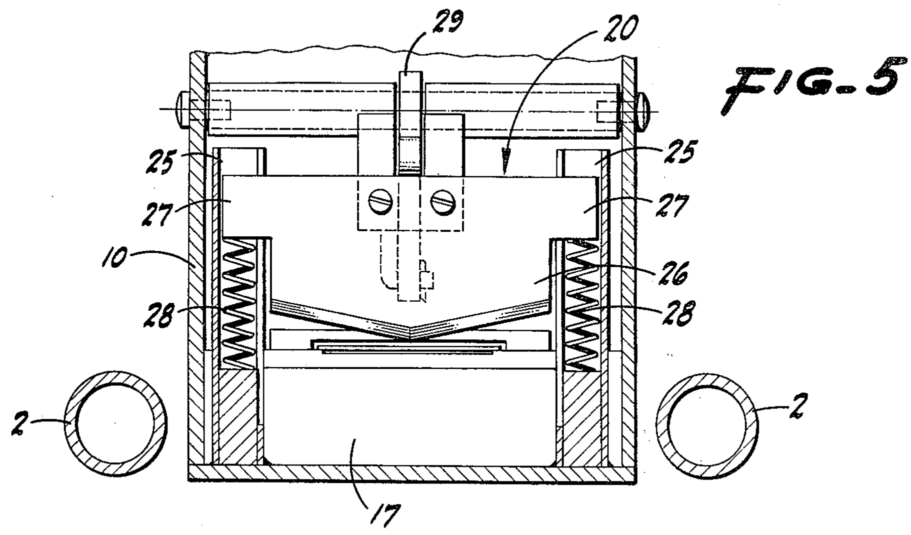
FIG-5
FIG-6
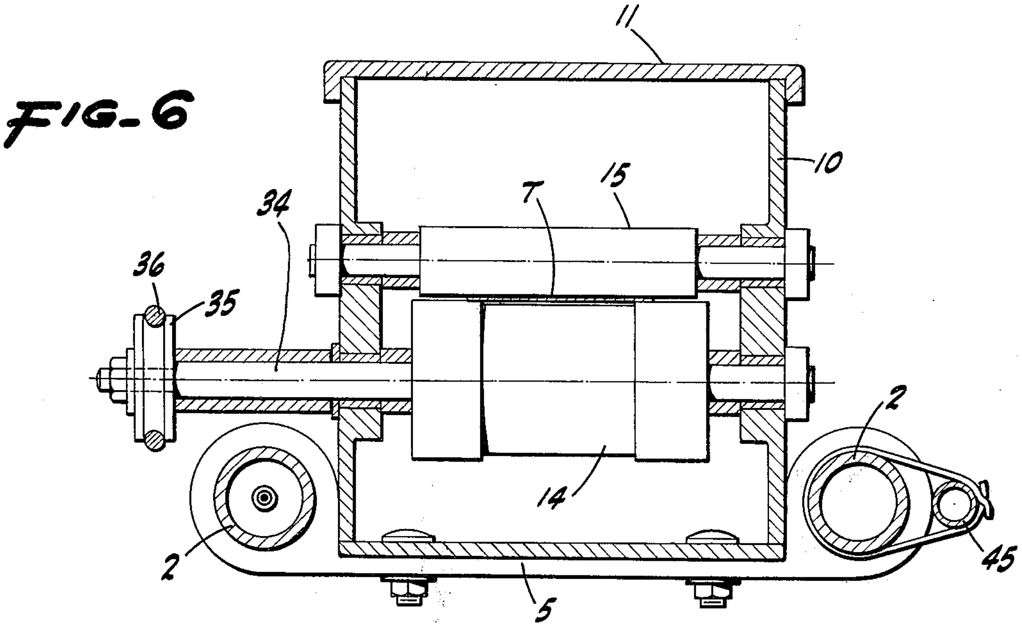
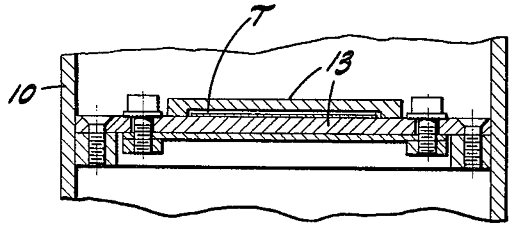
FIG-7

DRY WALL TAPING DEVICE

BACKGROUND OF THE INVENTION

It is currently common practice, in dry wall construction, to first apply by adhering (as a first step, and by plaster) a tape over each seam, and then after a waiting period of a day or more applying (as a second step) a thin, smooth, layer of finish plaster over the tape. This procedure requires return of the workmen to the job site for the second step, as well as an additional clean-up operation thereafter. As a consequence, dry wall taping is presently time and labor consuming with resultant inconvenience and lack of economy. The present invention was conceived in a successful effort to overcome such problems.

SUMMARY OF THE INVENTION

The present invention provides, as a major object, a relatively lightweight, hand-supported dry wall taping device operative—upon predetermined manipulation thereof—to apply to a dry wall seam, in a single pass lengthwise thereover, a tape adhered by glue and covered by a thin, smooth, layer of finish plaster; the device thus being timesaving and relatively economical in comparison to the commonly practiced two-step dry wall taping procedures.

The present invention provides, as another important object, a dry wall taping device, as above, which comprises a hand-supported frame, a unit on the frame operative—upon predetermined manipulation of the frame—to first apply glue to a length of the tape and then glue-affix the tape to the dry wall over said seam, and another unit on the frame operative—upon such manipulation of the frame, and in conjunction with but trailing the tape gluing and applying unit—to apply a thin, smooth, layer of finish plaster over the then-in-place tape.

The present invention provides, as a further object, a dry wall taping device which is designed for ease and economy of manufacture, and convenience of use.

The present invention provides, as a still further object, a practical, reliable, and durable dry wall taping device, and one which is exceedingly effective for the purpose for which it is designed; the device, in use, performing a novel method of dry wall seam taping.

BRIEF DESCRIPTION OF THE DRAWINGS:

FIG. 5 is an enlarged, fragmentary, transverse, sectional elevation taken substantially on line 5—5 of FIG. 3.

FIG. 6 is a transverse, sectional elevation on line 6—6 of FIG. 3.

FIG. 7 is a fragmentary, transverse, sectional elevation on line 7—7 of FIG. 3.

DESCRIPTION OF THE PREFERRED EMBODIMENT

Figure 2:
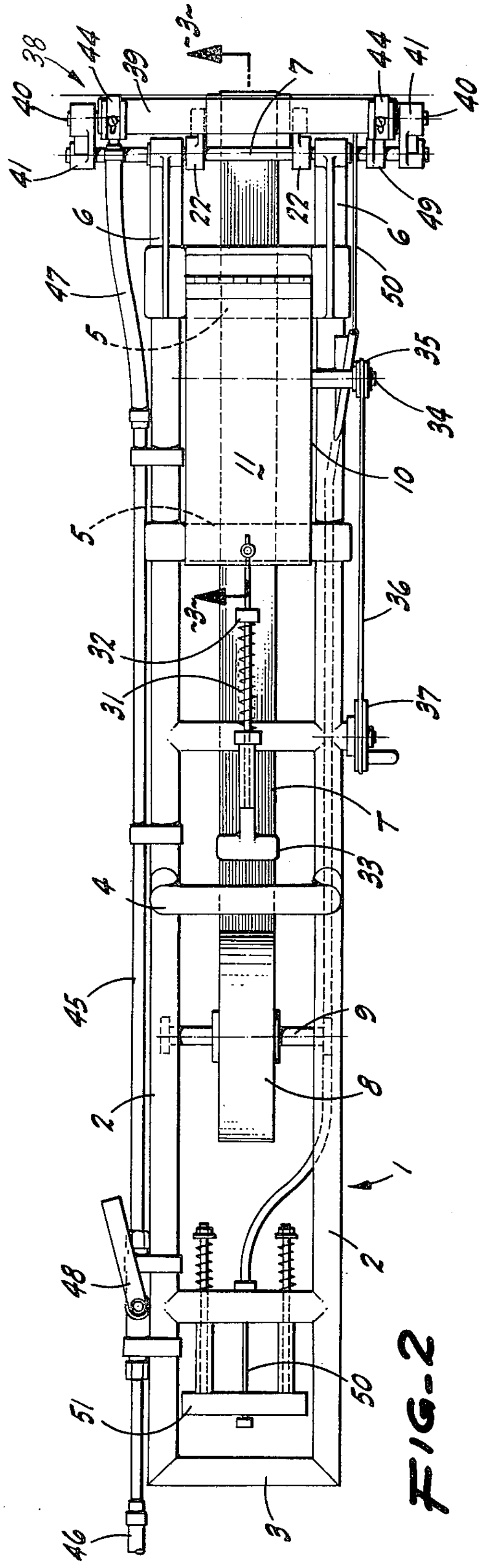
FIG. 2 is a top plan view of the same.
Figure 1:
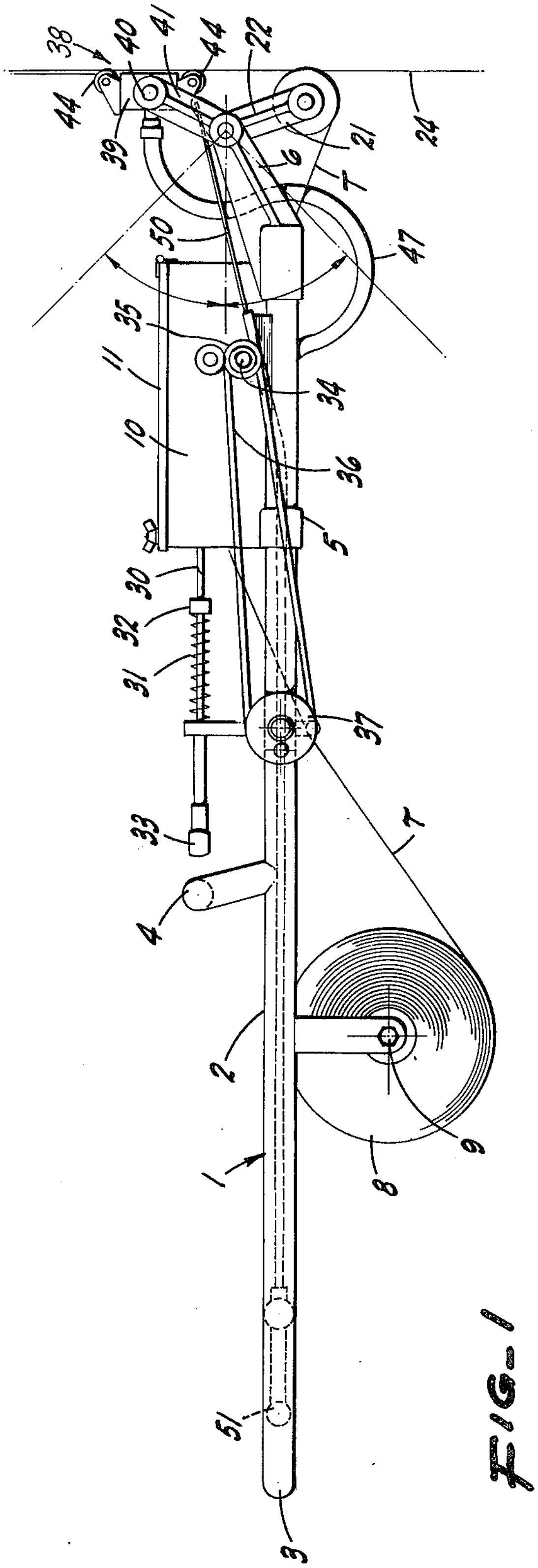
FIG. 1 is a side elevation of the device as in use in engagement with a dry wall.
Figure 3:
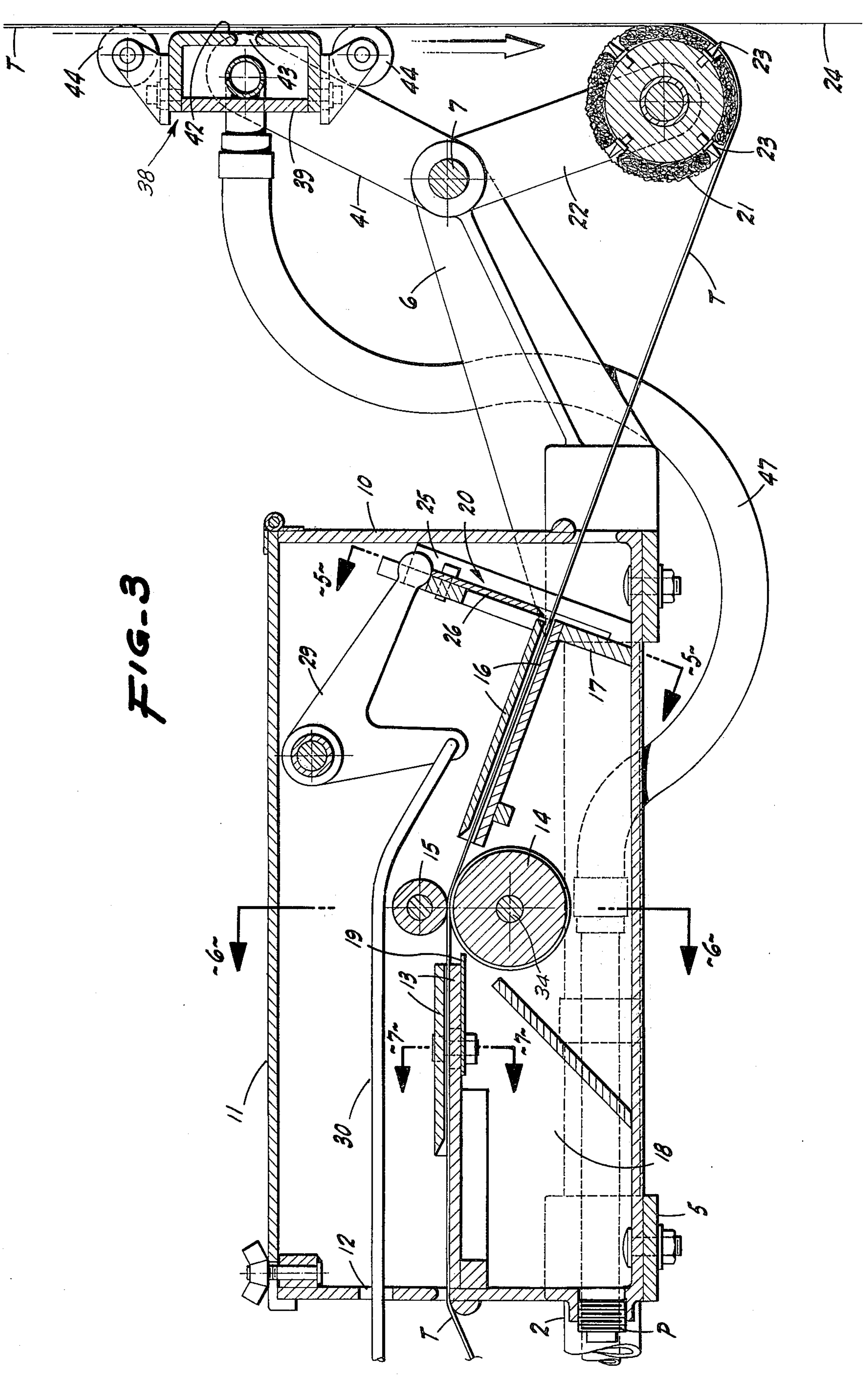
FIG. 3 is an enlarged, fragmentary, sectional elevation, taken substantially on line 3—3 of FIG. 2.
Figure 4:
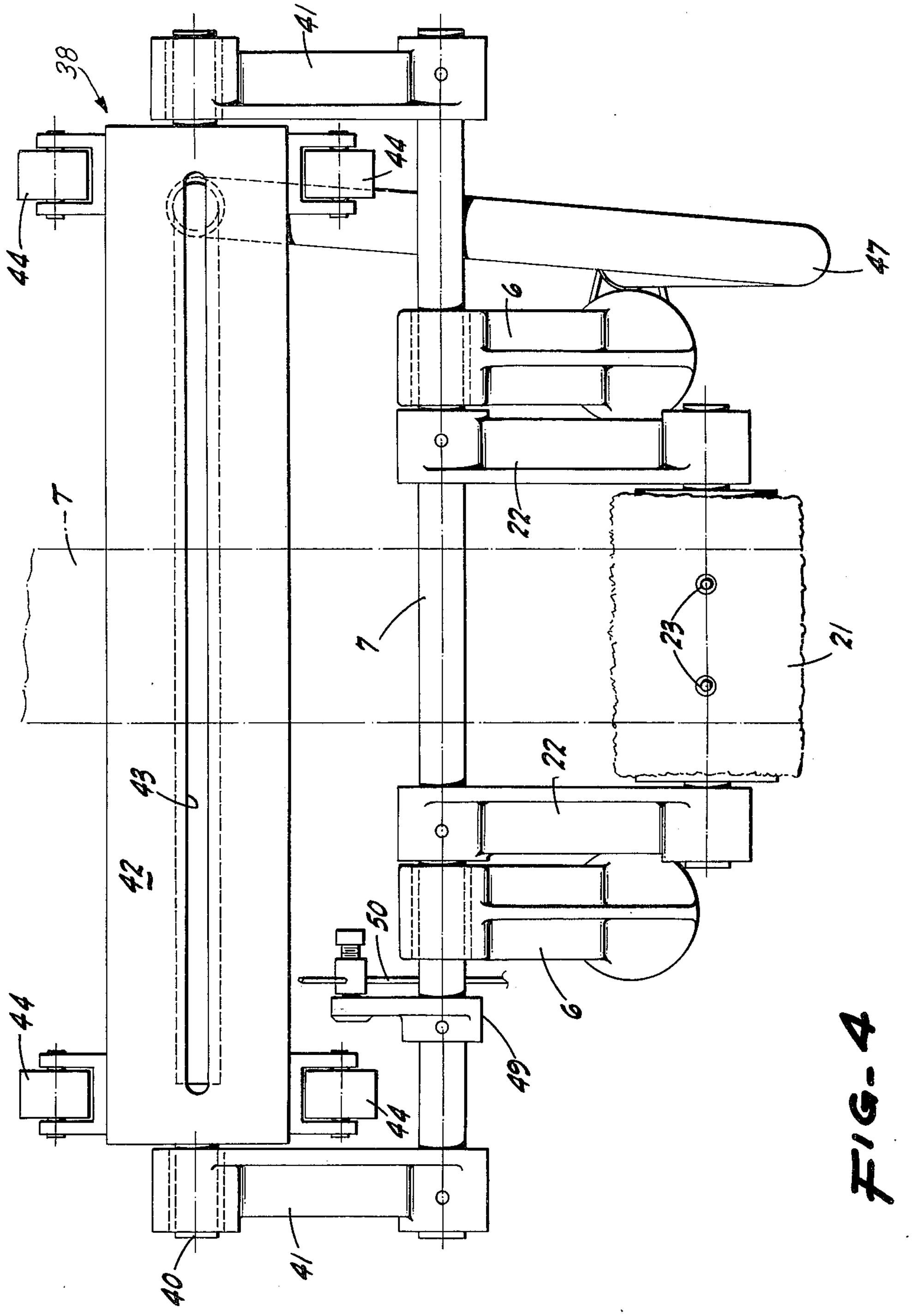
FIG. 4 is an enlarged front elevation of the device.

Referring now more particularly to the drawings and to the characters of reference marked thereon, the device comprises an elongated, lightweight frame, indicated generally as 1, which includes longitudinal, transversely spaced tubular side rods 2 connected at the rear end by a hand grip 3; there being another hand grip 4 of arch form connected to and extending between the side rods 2 a withinreach distance ahead of the rear hand grip 3. Longitudinally spaced cross bars 5 connect the side rods 2 ahead of the hand grip 4, with one of such cross bars substantially at the front ends of the rods 2, and from which front ends rigid brackets 6 project forwardly. A cross shaft 7 is journaled in, extends between, and projects beyond the outer extremities of said brackets 6.

The frame 1, constructed as above described, is adapted to be supported and manipulated by an operator grasping the grips 3 and 4.

A roll 8 of dry wall tape T is disposed beneath the frame 1 centrally of its sides and slightly to the rear of the hand grip 4; such roll 8 being carried on a suspended cross shaft 9. From the roll 8, the tape T—which is advanced through the device as will hereinafter appear—runs at a forward and upward incline to the rear of an enlongated rectangular housing 10 mounted on the cross bars 5; such housing 20 having a hinged lid 11 normally maintained in a closed position but openable when desired.

The tape T enters the housing 10 through a horizontal slot 12 in the rear of such housing some distance above the bottom thereof; the tape then passing, within the housing, through a horizontal two-plate guide 13 positioned only a short distance ahead of said slot 12.

Forwardly of the guide 13, the tape T engages over a transverse axis, glue-applying roller 14 journaled in the housing 10; the tape being held in contact with such glue-applying roller by a transverse axis, hold-down roller 15 journaled thereabove.

Ahead of the glue-applying roller 14, the tape passes through another two-plate guide 16 disposed at a forward and downward incline to a termination at its lower edge in contact with the upper edge of a cross wall 17 upstanding from the bottom of housing 10.

With the foregoing arrangement, the lower portion of the housing 10 between the rear thereof and said cross wall 17 forms a reservoir or well 18 for liquid glue; the guides 13 and 16 providing, in effect, top members for such well, with the upper portion of the glue-applying roller 14 projecting upwardly between adjacent, spaced edges of said guides. The rear of the housing is provided with a removable plug P to permit of filling (and flushing) of the wall 18.

The roller 14 is normally rotated by the engaged tape as it travels forwardly; the bottom of the roller receiving glue from the well 18 and then—as said roller continues to turn—transferring the glue onto the passing tape. A glue gauge plate 19 is mounted beneath the guide 13 and presents a working edge closely adjacent and parallel to the upturning side of the glue-applying roller 14 near the top thereof. Such roller 14 is slightly recessed intermediate its ends, as shown, to assure retention of adequate glue on the roller for transfer to the tape.

Upon leaving the guide 16, the tape passes through a normally inactive cut-off knife unit, indicated generally at 20, associated with the cross wall 17; such knife unit being later described in detail. Ahead of said knife unit 20, the tape runs out of the housing forwardly to and turns beneath a transverse axis, tape-applying cushion-faced roller 21 journaled in and extending between the outer ends of parallel, radial arms 22 fixed on and depending at an outward and downward incline from the cross shaft 7. If desired, the cushionfaced roller 21 may include sharp-pointed traction pins 23 which slightly penetrate the tape and prevent slippage.

The tape T runs upwardly from the roller 21 and is pressure-engaged thereby, and glue-affixed to a dry wall 24 over a seam thereof upon manipulation of the device—by the operator—in a downwardly sweeping direction with the roller and tape in wall engagement.

As the tape is thus being applied over the dry wall seam, the shaft 7, for the reason later apparent, holds the arms 22 in a fixed position relative to brackets 6 and frame 1 whereby said frame can be employed to exert pressure against the dry wall by the roller 21. Also, the action of the roller 21 on the tape as it is applied causes the tape to be unwound from roll 8 and pulled through the device.

After each seam of the dry wall is taped, the tape is cut off within the device by means of the knife unit 20, and which comprises the following:

Guideways 25 upstand at opposite ends of the cross wall 17, and a normally raised, transverse, guillotine-like blade 26 is disposed therebetween; such blade including lateral ears 27 at the top which work in the guideways 25 against compression springs 28 therein. The blade 26 is manually lowered, to sever the tape immediately ahead of guide 16, by a mechanism which includes a transverse axis bellcrank lever 29 journaled in housing 10 with one end of such lever bearing in down-thrust relation on the upper edge of blade 26. The other end of the bellcrank lever 29 is connected to a rearwardly extending push-pull control rod 30 normally urged forwardly (to raise the blade 26) by a surrounding spring 31 disposed rearwardly of said housing 10 and bearing against a collar 32 on the rod; there being a transverse handle 33 on the rear end of said rod 30 immediately ahead of hand grip 4. By manually pulling rearwardly on handle 33, the resulting movement of the rod 30 swings the bellcrank lever 29 in a direction such that the blade 26 is thrust downward to sever the tape T.

After the tape is thus severed, it is necessary that a length of said tape be manually advanced ahead of the frame for engagement about the roller 21 from below and initial application to the dry wall at the upper end of another seam. To so manually advance a length of the tape, the shaft 34 of the glue-applying roller 14 is fitted, exteriorly of the housing 10, with a pulley 35; there being an endless belt 36 trained between pulley 35 and a crank wheel 37 rotatably mounted on one side of the frame 1 ahead of the hand grip 4. With the above arrangement, manual rotation of crank wheel 37 causes rotation of hold-down roller 15 and resultant advance beyond guide 16 of a length of tape to engage about roller 21 from below and thence extend upward for glue-affixing to the dry wall at the upper end of said next seam.

Upon the device being manually swept down a dry wall with the roller 21 glue-affixing the tape over a seam, there is immediately sequentially applied—over such glue-affixed tape—a thin, smooth, layer of plaster; this being accomplished by a wall-engaging plaster-applying unit, indicated generally at 38, which trails roller 21 and is constructed as follows:

A chambered or hollow, transversely extending, horizontal, plaster extruding and smoothing head 39 is disposed, in parallelism, in spaced relation above the tape-applying roller 21; such head including end trunnions 40 rockably journaled in the outer ends of radial arms 41 fixed on and extending at an upward and outward incline from the ends of cross shaft 7.

The head 39 includes a wall-engaging face 42 having a substantially full-width slot 43 therein for extruding plaster from within the head onto the wall and glue-affixed tape, whence the face 42 smooths the applied plaster. The thickness of the applied plaster is controlled by wall-contacting gauge wheels 44 on the top and bottom of head 39 at the ends thereof.

Semi-fluid plaster is fed, under pressure, to the plaster-extruding head 39 and therefrom out of the slot 43, by means of a conduit 45 which extends along one side of frame 1; the rear end of such conduit being connected to a pressure source (not shown) of the plaster by a flexible hose 46, while said conduit 45, at the forward end of the frame, is coupled to the head 39 by a flexible hose 47. A hand valve 48 in conduit 45 controls the flow of plaster to the head 39.

The cross shaft 7 is manually part-turned in order to place both roller 21 and head 39 in proper wall engagement at the start of each seam taping applying; this being accomplished by the following mechanism:

A short radial finger 49 is fixed on cross shaft 7, and a flexible pull wire 50 is connected to the outer end of such finger and thence extends rearwardly along the frame to a rear end termination adjacent the rear grip 3; such wire being encased, for a major portion of its length, in a flexible guide sheath as is common practice. At its rear end, the pull wire 50 is attached to a transverse, spring-advanced finger piece 51 which is disposed immediately ahead of the rear grip 3 and within finger reach thereof. The operator—upon disposing the hand-held frame 1 in a convenient position projecting toward the wall—finger engages the piece 51 and pulls rearwardly thereon, and which —through the medium of the described arrangement—causes the assembly of roller 21 and head 39 to rotatively assume a position in which both properly bear against the wall for the seam taping operation, and which is then effected rapidly and easily in the manner herein described.

With the described device, there is performed a novel method of dry wall seam taping; such method including the steps of applying glue to one face of a run of tape, glue-affixing such run of tape to a dry wall over a seam thereof, and then applying a finish layer of plaster over the glue-affixed tape, all in a sequential, closely timerelated operation; i.e., in immediate succession. All directional reference herein shall be deemed to be in relation to the device when manually supported in a position projecting forwardly from the operator.

From the foregoing description, it will be readily seen that there has been produced such a dry wall taping device as substantially fulfills the objects of the invention, as set forth herein.

While this specification sets forth in detail the present and preferred construction of the dry wall taping device, still in practice such deviations from such detail may be resorted to as do not form a departure from the spirit of the invention as defined by the appended claims.

We claim:

1. A dry wall taping device, comprising a hand-supported and manipulated frame having a handle portion at a first end and a tape applying end portion at a second opposite end for projection by an operator into close proximity to a dry wall having a seam, for applying glue to a dry wall tape, securing the glued tape to a dry wall and plastering over the secured tape in generally immediate succession, and including means to support a roll of tape in position for the tape to pay out and run to the tape applying end of the frame, means intermediate the tape roll support and the tape applying end to apply glue to at least one side of said run of tape, a transverse axis tape applying roller at the tape applying end of the frame, means mounting the roller in position to engage said run of tape to roller-pressure glue-affix the tape over a seam upon dry wall traversing motion imparted to the frame by said operator and attendant paying out of said tape, a plaster extruding and smoothing head means for applying a layer of plaster of a predetermined controlled thickness at the tape applying end of the frame, means mounting said head means in connection with the frame whereby said head—when pressure-fed with plaster, and upon traversing motion of the frame—applies and smooths, in trailing relation to the tape applying roller, a finish layer of plaster over the glue-affixed tape, and means in part on the frame to feed plaster under pressure to said head.

2. A dry wall taping device, as in claim 1, in which the frame is elongated; there being one hand grip at the first end of the frame, and another hand grip intermediate the ends of said frame.

3. A dry wall taping device, as in claim 1, including a housing on the frame, the run of tape passing through the housing, and the glue-applying means being disposed in the housing and comprising a glue applying roller journaled in said housing beneath but in engagement with the tape, and a glue well in the housing; the roller, whose lower portion extends into the glue well, being rotated by said passing run of tape.

4. A dry wall taping device, as in claim 3, including a normally inactive, tape cut-off knife unit mounted in the housing intermediate the glue-applying roller and the tape applying roller, and means operative to actuate said knife unit to sever the tape.

5. A dry wall taping device, as in claim 4, including a hand grip on the frame; said knife unit actuating means including a, longitudinally movable pull element, and a handle on such pull element adjacent and finger-accessible from the hand grip.

6. A dry wall taping device, as in claim 3, including a tape hold-down roller journaled in the housing in parallel relation above the glue-applying roller and bearing in contact with the run of tape engaged thereby; there being manually actuated means, operative from exteriorly of the housing, to rotate the glue-applying roller in a direction to advance said run of tape a distance beyond the housing toward said second end preparatory to a seam taping operation.

7. A dry wall taping device, as in claim 1, including a transverse shaft secured on the second end of the frame; the tape applying roller mounting means comprising, with said transverse shaft, spaced radial projecting arms, and the tape applying roller spanning between and being journaled in connection with such arms.

8. A dry wall taping device, as in claim 7, in which the head-mounting means comprises, with said transverse shaft, spaced radial arms and the head spanning between and being journaled in connection with such last-named radial arms.

9. A dry wall taping device, as in claim 8, in which the transverse shaft is journaled for turning about its axis; there being a radial lever secured to the shaft, and hand-actuated means to impart movement to such lever whereby to turn the transverse shaft in a direction to cause the roller and head to assume proper relative positions for proper dry wall engagement.

10. A dry wall taping device, as in claim 9, including a hand grip on the frame; such hand-actuated means including a pull element connected to the lever and extending to adjacent the hand grip, and a handle on the pull element adjacent, and fingeraccessible from, the hand grip.

11. A dry wall taping device, as in claim 1, in which the plaster extruding and smoothing head means is hollow and flat faced; there being a horizontal slot, in said flat face, for extrusion of the plaster and gauge wheels carried by said head means for engagement with a dry wall.

12. A dry wall taping device, as in claim 1, in which the plaster extruding and smoothing head means is hollow and formed with a slot for extrusion of the plaster; the plaster-feeding means including a conduit extending along the frame, a hand valve in the conduit, and a flexible hose connected in communication between the conduit and said head.

* * * * *